(12) United States Patent
Steinbichler et al.

(10) Patent No.: US 6,769,894 B2
(45) Date of Patent: Aug. 3, 2004

(54) APPARATUS FOR THE INJECTION MOLDING OF PLASTIC MATERIAL

(75) Inventors: Georg Steinbichler, Rottenmann (AT); Harald Ebenhofer, Perg (AT); Karsten Zyrull, Schiffweiler (DE); Pedro Gomez, Linz (AT)

(73) Assignee: Engel Maschinenbau Gesellschaft m.b.H., Schwertberg (AT)

( * ) Notice: Subject to any disclaimer, the term of this patent is extended or adjusted under 35 U.S.C. 154(b) by 73 days.

(21) Appl. No.: 09/975,886

(22) Filed: Oct. 12, 2001

(65) Prior Publication Data

US 2002/0086075 A1 Jul. 4, 2002

(30) Foreign Application Priority Data

Oct. 13, 2000 (AT) .................................. A 1755/2000

(51) Int. Cl.[7] .............................................. B29C 45/16
(52) U.S. Cl. ...................... 425/130; 425/542; 264/572
(58) Field of Search ................... 425/130, 542; 264/572

(56) References Cited

U.S. PATENT DOCUMENTS

| | | | | |
|---|---|---|---|---|
| 4,140,672 A | * | 2/1979 | Kataoka | 264/45.1 |
| 4,824,732 A | * | 4/1989 | Hendry et al. | 428/542.8 |
| 5,223,278 A | * | 6/1993 | Nicetto | 425/150 |
| 5,256,047 A | * | 10/1993 | Moldovanyi | 425/130 |
| 5,670,112 A | * | 9/1997 | Csongor et al. | 264/572 |
| 5,759,476 A | * | 6/1998 | Steinbichler | 264/512 |
| 5,814,353 A | * | 9/1998 | Nagel | 425/149 |

2002/0167103 A1 * 11/2002 Ickinger ................... 264/40.3

FOREIGN PATENT DOCUMENTS

| | | | |
|---|---|---|---|
| DE | 19631804 | 8/1996 | ............. B66F/3/42 |
| DE | 19903682 | 8/2000 | |
| DE | 19903682 A1 | 8/2000 | |
| EP | 0370487 | 5/1990 | |

OTHER PUBLICATIONS

Linse, Hermann, *Elektrotechnik für Maschinenbauer*, B. G. Teubner, Stuttgart, 1987.
Michael, W. et al., "Kuhlzeit Reduzieren Mit Der Wasser—Injektionstechnik Kunstst Hanswer Verlag", Munchen, DE, vol. 90, No. 8 Aug. 2000, pp. 67–72.
http://www.wiley-vch.de/vch/journals/2404/markt, Aug. 12, 2002.
Menny, Von Professor Dipl. –Ing. Klaus, *Strömungsmaschinen*, B. G. Teubner Stuttgart 95/1072, pp. 230–235.
Krämer, Horst, *Elektrotechnik im Maschinenbau*, Friedr. Vieweg & Sohn, No. 84 0899, pp. 212–218.
Michaeli, Walter et al., *Spritzgiessen*, "Gas oder Wasser?", Carl Hanser Verlag, 19 1–5.

* cited by examiner

*Primary Examiner*—Robert Davis
*Assistant Examiner*—Joseph S. Del Sole
(74) *Attorney, Agent, or Firm*—Notaro & Michalos P.C.

(57) ABSTRACT

An apparatus for the injection molding of plastic material, comprising a mold (7) into which molten plastic material is introduced, wherein there is provided a device for introducing liquid, in particular water, into the interior of the molten material, which includes a pump (3) driven by a motor (4), wherein the speed of rotation of the motor (4) and/or the stroke volume of the pump (3) is variable.

12 Claims, 2 Drawing Sheets

APPARATUS FOR THE INJECTION MOLDING OF PLASTIC MATERIAL

FIELD AND BACKGROUND OF THE INVENTION

The invention relates to an apparatus for the injection molding of plastic material, comprising a mold into which molten plastic material is introduced, wherein there is provided a device for introducing liquid, in particular water, into the interior of the molten material, which includes a pump driven by a motor.

Gas injection technology has been used for about 15 years on an industrial basis for the production of injection-molded hollow bodies. The gases used (generally nitrogen) however suffer from the disadvantage that process management is more difficult by virtue of the high degree of compressibility and cooling of the molten plastic material from the cavity side is not efficient, by virtue of the low heat absorption capacity of the gases.

SUMMARY OF THE INVENTION

Those disadvantages can be overcome by using liquid, in particular water, in place of a gas. In that situation, in the simplest case, the water is injected into a tool cavity which is partially filled with molten plastic material. In the first step in the process, complete shaping of the component is effected by displacement of the molten material by way of the injected water, with the simultaneous formation of the cavity in the inner core. Thereafter, the water pressure performs the post-pressure function, in a similar manner to the situation in conventional injection molding. Usually, in the pressure-holding phase, the water is held at a pressure level at which vaporization of the water is avoided. By virtue of its substantially greater specific heat the water can also absorb a considerable part of the amount of heat from the cavity side, from the molten material. If, in dependence on component geometry, in a so-called flushing process, it is possible to produce a water through-flow, the cooling time can be reduced by up to 70%, in comparison with gas injection technology.

Process variants which are known from gas injection technology such as expelling excess molten material from the inner core of a component into a subsidiary cavity or back into the screw antechamber can also be implemented with the water injection technology.

Governed by historical development, the test installations which are known for water injection are structurally derived from the installations which are known for gas injection technology. In that case however by virtue of the high compressibility of the gas the nitrogen is almost exclusively injected in pressure-regulated mode. The time required for cavity formation is thus greatly dependent on the viscosity of the molten material and thermal boundary conditions. In the case of water in contrast, because of the low level of compressibility, outside the pressure-holding phases, control or regulation by way of the volume flow presents itself as an option.

All previously known installations involve pumps driven at a constant speed of rotation. That is not advantageous both for energy reasons and also for reason relating to wear when using a pressure-limiting valve in the by-pass (see Walter Michaeli et al, "Kühlzeit reduzieren mit der Wasser-Injecktionstechnik" in KU Kunststoffe, volume 90 (2000) 8).

In accordance with the invention it is provided that the speed of rotation of the motor and/or the stroke or delivery volume of the pump is variable.

BRIEF DESCRIPTION OF THE DRAWINGS

Details of the invention are described hereinafter with reference to the drawing in which.

DETAILED DESCRIPTION OF THE PREFERRED EMBODIMENTS

Figure 1:
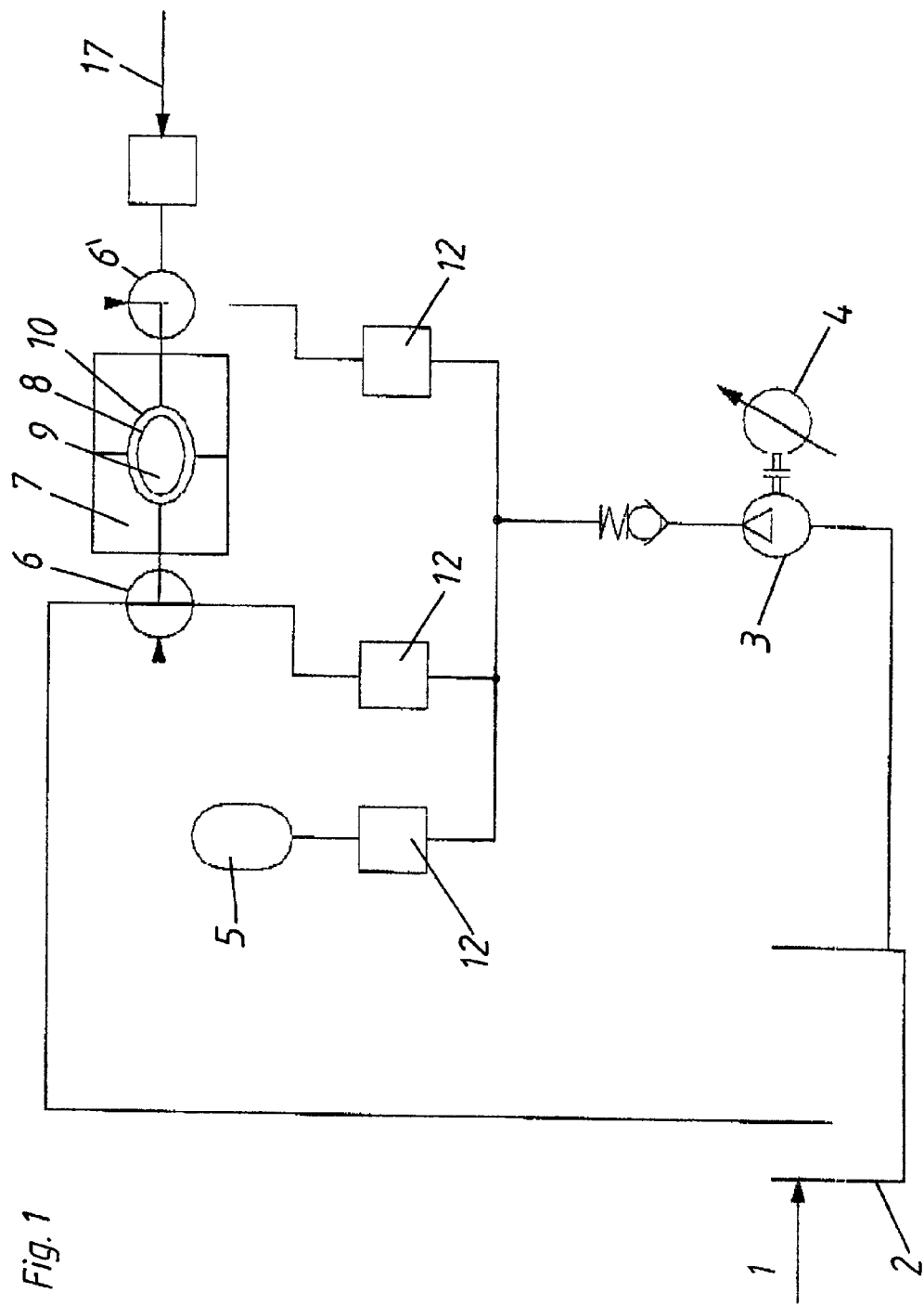
FIG. 1 is a diagrammatic view of an injection molding installation.

The core aspect of the installation shown in FIG. 1 is the mold 7, into the cavity 10 of which plastic material can be introduced in known manner.

The particular aspect of the underlying process of the invention is the introduction of water into the molten plastic material while it is setting in the mold 7. In the so-called inflation process the cavity 10 is firstly partially filled with plastic material 8, then water for industrial use which is supplied to the tank 2 by way of a conduit 7 is injected into the molten material by way of the pump 3, the shut-off valves 12 and the three-way valves 6, 6', so that a water-filled cavity 9 is formed in the molten material. When the mold is filled the set pressure is maintained by way of a pressure storage means 5. The valve 6 is then switched over to the tank conduit, a blow-out needle is pierced into the cavity 9 and the water is blow out of the cavity 9 in the interior of the plastic material 8 by a feed of air by way of the conduit 17.

Instead of the described inflation process it is also possible to execute a blow-out process which differs in that the cavity 10 is firstly completely filled with plastic material and the latter is partially transferred into a subsidiary cavity (not shown). Flushing processes are also known in which a liquid exchange takes place in the interior of the injected member during the entire procedure involving hardening of the molten material.

In all the illustrated cases, a per se known diaphragm storage means 5 is used in the pressure-holding phase. The operation of charging it up to a variable holding pressure is effected before the start of water injection.

An advantage of the described process lies in the possibility of reusing the water employed. For that purpose, it is necessary to filter the water and preferably to provide for the removal of germs from the water by means of UV-irradiation directly at the water container.

A device for deionization (desalination) of the water is installed at the automatic fresh water make-up feed for making up for losses.

The water circuits are preferably shut off directly by way of a three-way valve at or in the tool. That is particularly important as, in the previously known cases, the directional control valves are disposed in the installation and relatively long conduit lengths are filled with air when blowing out the water. That air however is inevitably injected into the molten material in the next cycle and forms an unwanted air cushion which partially reduces the cooling effect and thus nullifies the actual advantage of water injection.

Figure 2C:
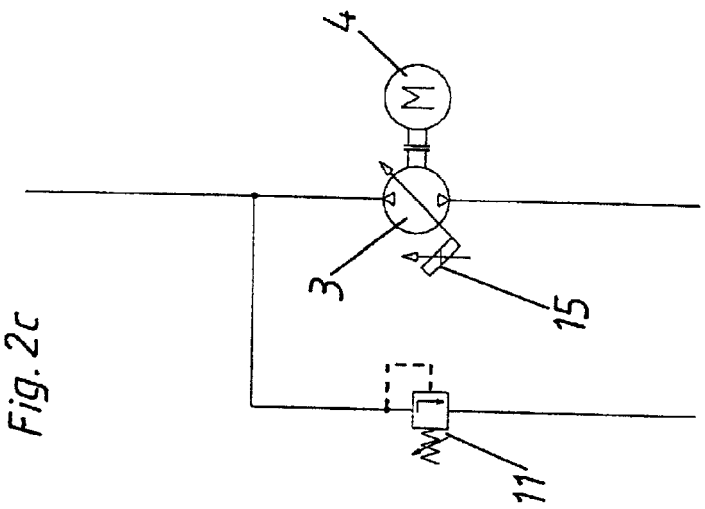
FIGS. 2a through 2c are three examples of regulatable motor/pump combinations.
Figure 2B:
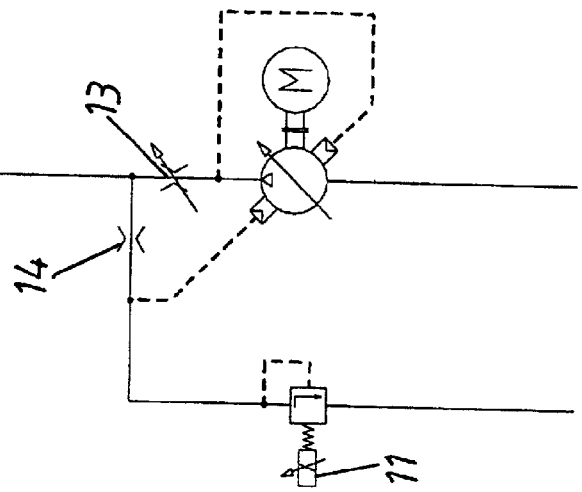
Figure 2A:
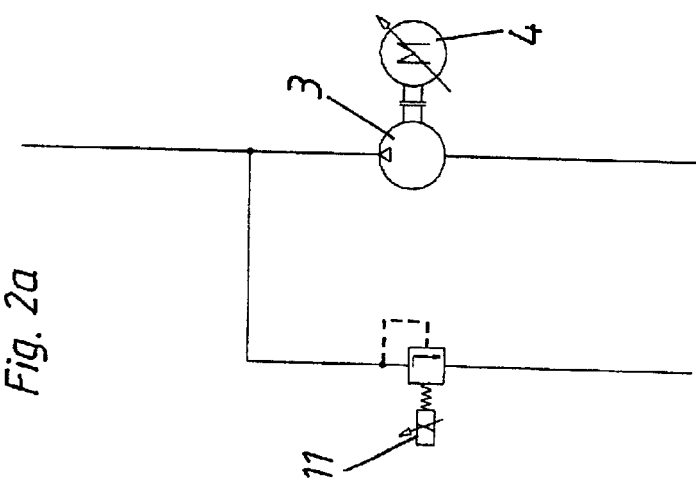

FIGS. 2a through 2c show examples of the way in which the energy-saving supply of water can be effected in accordance with the invention.

The embodiment of FIG. 2a has a pump 3 with a constant delivery volume. The delivery amount is controlled by varying the speed of rotation of the motor 4 which can be for example a servo motor or a three-phase asynchronous motor with frequency conversion. If instead of quantitative regulation during the holding phase pressure regulation is to be effected, then the pressure-proportional valve 11 serves for that purpose, by way of which amounts which are only minimal in comparison with the conventional by-pass flow away to the tank 2.

The embodiment of FIG. 2b uses a motor involving a constant speed of rotation, for example a three-phase asynchronous motor. The pump 3 is in the form of a regulating pump. The delivery flow regulation action is effected by way of the adjustable throttle 14. If on the other hand (during a holding phase) pressure regulation is to be effected, a slight subsidiary flow goes by way of the throttle 12 and the pressure-proportional valve 11.

The embodiment of FIG. 2c again uses a motor involving a constant speed of rotation, the valve 11 is a simple pressure-limiting valve and adjustment of the pump 3 is effected by way of an electrical control 15 which determines the delivery volume of the pump.

What is claimed is:

1. An apparatus for injection molding plastic material, comprising a mold into which molten plastic material is introduced, a device for introducing a liquid into the interior of the molten plastic material, the device comprising a constant delivery pump driven by a motor, the speed of rotation of the motor being variable.

2. The apparatus of claim 1, wherein the speed of rotation is selectively variable to produce a given delivery amount.

3. The apparatus of claim 2, wherein the motor driving the pump is one of a servomotor and a three-phase asynchronous motor.

4. The apparatus of claim 3, further comprising three-way valves between the pump and the mold for controlling the flow of the liquid.

5. The apparatus of claim 4, wherein the liquid is water.

6. The apparatus of claim 2, further comprising three-way valves between the pump and the mold for controlling the flow of the liquid.

7. The apparatus of claim 6, wherein the liquid is water.

8. The apparatus of claim 1, further comprising three-way valves between the pump and the mold for controlling the flow of the liquid.

9. The apparatus of claim 8, wherein the liquid is water.

10. The apparatus of claim 1, wherein the motor driving the pump is one of a servomotor and a three-phase asynchronous motor.

11. The apparatus of claim 10, further comprising three-way valves between the pump and the mold for controlling the flow of the liquid.

12. The apparatus of claim 1, wherein the liquid is water.

* * * * *